June 7, 1960
E. H. REHNBORG
2,940,059
POTENTIOMETER
Original Filed April 20, 1956
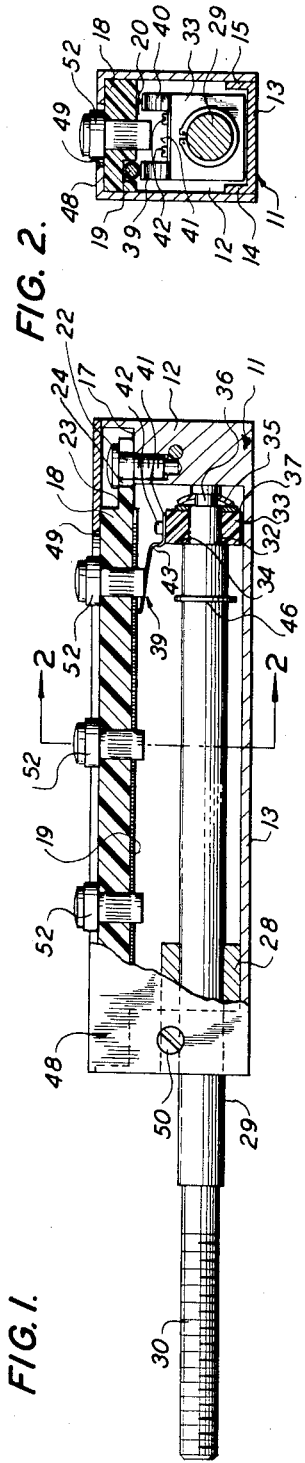
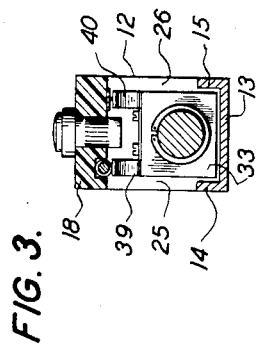
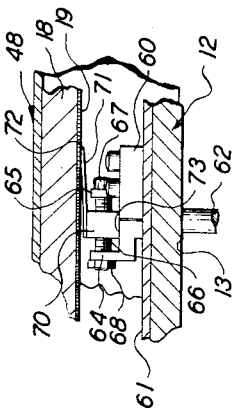
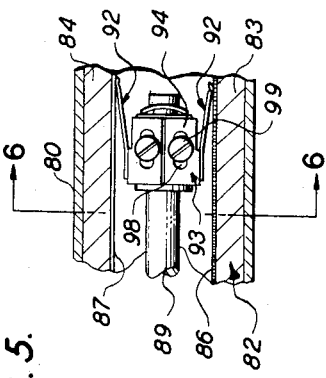
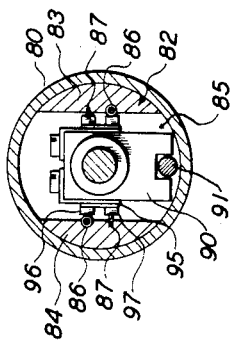
INVENTOR.
EDWARD H. REHNBORG
BY
Christie, Parker & Hale
ATTORNEYS

United States Patent Office 2,940,059
Patented June 7, 1960

2,940,059

POTENTIOMETER

Edward H. Rehnborg, San Gabriel, Calif., assignor to Edcliff Instruments, Monrovia, Calif., a corporation of California Original application Apr. 20, 1956, Ser. No. 579,601. Divided and this application June 5, 1959, Ser. No. 818,481

4 Claims. (Cl. 338—183)

The invention relates to linear motion potentiometers.

This application is a divisional application of my co-pending application, Serial No. 579,601, filed April 20, 1956, now abandoned.

Conventional linear motion potentiometers have an electrical resistance element or resistor which is contacted by an electrically conductive contact arm movable along the resistor. Potential may be measured across the contact arm and an end of the resistance element. Output voltage therefore changes with the change in position of the contact arm. It is desirable that the displacement of the contact arm be proportionate to the change in output voltage accompanying that displacement.

Usually the displacement is accomplished by means of a slider carrying the contact arm. A potentiometer is in phase when the voltage reading of the resistor with respect to the voltage range of the resistor is proportionate to the displacement of the slider. Phasing or phase adjusting is generally accomplished by a physical adjustment of the contact arm with respect to the resistor while the slider is fixed in a predetermined position.

Conveniently, a slider is temporarily fixed at the midpoint of its travel and the contact arm is adjusted with respect to the slider so that the output voltage measured across the contact arm and an end of the resistor is commensurate with the position of the slider. If this adjustment is accurately made, the change in output voltage will be proportionate to the displacement of the slider throughout the range of the potentiometer.

Conventional potentiometers are frequently disassembled and reassembled in an effort to adjust the position of the contact arm with respect to the electrical resistor so that contact position and resistor values are in phase. In such devices reassembly almost invariably destroys the accuracy of such phasing because of the difficulty of replacing the electrical resistance element in its exact former position with respect to the slider. This cumbersome and inaccurate procedure is necessary because many conventional linear motion potentiometers mount the electrical resistance element in a mechanically separate portion from the slider bearing the contact arm. For example, many potentiometers have the resistor mounted in the cover of the device. In such instruments means of fastening the cover with respect to the slider cannot be made precise enough to enable the cover to be replaced in the exact position with respect to the slider that it had before assembly. Hence, a trial and error process to phase adjust the conventional potentiometer is necessary.

The linear motion potentiometer of the invention comprises a framework and an elongate resistance element rigidly supported in the framework. A slider is slidably mounted in the framework. A contact arm includes a supporting means extending from the slider. A screw is rotatable in the supporting means. An internally threaded yoke engages the screw, the yoke being adapted to move in a path parallel to the travel of the slider when the screw is turned. A conductive strip is fastened to the yoke and is in slidable contact with the electrical resistance element. A closure member is mounted to the framework to enclose the resistance element and the contact arm. Electrical conductors are connected to the resistance element and the contact arm and extend exteriorly of the framework and the closure member. Means are provided exterior of the framework and the closure member for moving the slider within the framework.

Either the resistance element or the conductive strip of the contact arm may be moved with respect to the slider while the slider is fixed temporarily in the framework at a chosen position along the slider's travel. The framework may be open at either or both of its sides or may be open at the top or bottom to provide access to the contact arm. A framework having paired end posts is open at both ends. The position of the opening depends upon the number and type of electrical resistance elements mounted in the potentiometer.

The adjustable contact arm provides a structure facilitating adjustment of the position of the conductive strip with respect to the resistance element so that it remains in engagement with the resistance element during the adjustment. This is done by turning the screw to move the yoke while the slider remains in a given position. The structure of the contact arm enables precise phase adjustments and provides important advantages, even when used in a linear potentiometer with a resistance element which cannot be adjusted with respect to the slider.

Since most adjustable resistors have a shorting bar paralleling the electrical resistor, the contact arm of the resistor is usually combined with the contact arm for the shorting bar. The shorting bar forms one component of an electrically conductive path connected to the contact arm and extending exteriorly of the framework. The paired arms are conventionally made from a single conductive piece so that need for auxiliary electrical connection between the two arms is obviated. There is no necessity for phasing the shorting bar contact arm, however, so the two arms may be separate in embodiments of the invention.

The embodiments of the invention are described more fully in the following detailed description and drawing, in which:

Fig. 1 is an elevation, partly in section, of one embodiment of the invention;

Fig. 2 is a sectional elevation taken along line 2—2 of Fig. 1;

Fig. 3 is a sectional elevation similar to Fig. 2 in which the cover of the device is removed;

Fig. 4 is a fragmentary sectional elevation illustrating an alternate means for adjusting the contact arm;

Fig. 5 is a fragmentary plan section illustrating further alternate means for adjusting the contact arm; and Fig. 6 is a sectional elevation taken along line 6—6 of Fig. 5.

Figs. 1 through 3 illustrate a potentiometer having a framework 10 which has a subframe 11 with end pieces at its opposite extremes, end piece 12 being visible in Fig. 1. The end pieces are connected by a bottom 13. Narrow flanges 14, 15 extend upwardly from the outer surface of the bottom and reach from end piece to end piece (see Fig. 3). A recessed upper shoulder 17 in each end piece supports a carrier plate 18 to which an elongate electrical resistor 19 and a shorting bar 20 are affixed. The carrier plate is fixed to the subframe, making the plate a part of the framework by means of binding screws such as screw 22 which extends through a slotted tab 23 of the carrier plate and is threaded into end piece 12. The binding screws clamp the carrier plate securely at each of its ends to the subframe so that the relationship of the resistor to the framework is fixed. A slot 24 in the tab allows the position of the plate to be changed. The under surface of the carrier plate, the end pieces of the subframe and the flanges of the subframe bottom define openings 25, 26 in the side faces of the framework.

A bushing 28 press-fitted into one of the end pieces journals a shaft 29 in the framework. An exterior end of the shaft has a thread 30 for connecting the shaft to any desired means of moving it. The opposite end of the shaft has a first reduced cylindrical portion 32 about which a slider 33 is mounted. The slider is forced against a shaft shoulder 34 by a bowed washer 35 seated on a second reduced cylindrical portion 36 of the shaft. The washer bears against a disk washer 37 interposed between the slider and the bowed washer. The arrangement permits the shaft to be freely rotatable in the framework and slider.

An electrical contact arm 39 and a shorting arm 40 are carried by the slider. The arms extend from a bracket 41 fastened to the slider by screws 42 tapped into the slider.

Contact arm 39 has a free end in contact with the electrical resistor. Between the free end and the bracket the arm includes an upwardly turned portion 43 attached to the bracket and a slanting strip 44 terminating in the free end. Arm 40 is similarly constructed.

A stop ring 46 resides in a groove in the shaft adjacent the slider. A U-shaped closure member or cover 48 having an elongated opening 49 in its upper surface encloses the contact arm and the electrical resistor and is fastened to the framework by means of screws such as flat head screws 50. The upper opening permits access to a plurality of electrical conductors or terminals 52 extending downwardly through the carrier plate to provide electrical connections for the resistor and the shorting bar.

In operation the voltage output or voltage transfer of the potentiometer is adjusted by sliding shaft 29 within the framework so that contact arm 39 moves along resistor 19. The travel of the slider 33 carried by the shaft is limited by stop ring 46 at one end of the stroke and by end piece 12 at the opposite end of the stroke. Current flows through the potentiometer illustrated between the resistor and shorting bar, which are electrically coupled through bracket 41 by means of the contact arms 39 and 40. The shorting bar and the opposite ends of the resistor are connected to the terminals 52 by conventional means (not shown).

The phase-adjusting of the potentiometer is done before cover 48 is placed on the framework. In the embodiment of Fig. 1 through 3 the phase-adjusting may be done in two ways. In one method the carrier plate 18 is first fastened to the subframe so that the resistor has a fixed relationship to the framework. The slider is then moved a chosen fraction of its total travel and the voltage output of the potentiometer is noted. The potentiometer is phased by distorting contact arm 39 by changing the angle portion 43 makes with bracket 41 to move the free end of the arm from point to point on the resistor while the slider is fixedly held within the framework. Arm 39 is preferably of bendable conductive material so that the bend may be made without harm to the arm. The arm may be bent so that the free end contacts the resistor at the precise point needed to synchronize the voltage reading with the position of the slider. The openings in the face of the framework make access to the contact arm easy. When the phase-adjustment has been made, the closure member is placed on the potentiometer so that external factors will not affect the contact arm setting.

A second method of phasing the potentiometer of Figs. 1 through 3 involves the re-positioning of the carrier plate and the resistance element supported in it. The slider is temporarily fixed in the framework at a desired position. As in the first phase adjusting method, the position may be at the center of slider travel, at the end of the travel, or at special tap positions. The fixing of the slider also fixes the juncture point of the contact arm and the resistance element. The relationship of the resistance element to the slider is changed by loosening the screws at both ends of the carrier plate, and then moving the carrier plate to change the juncture of the resistance element with the contact arm until the voltage reading agrees with the slider position. The screws are then tightened to secure the resistance to the framework. Either method of phase-adjusting permits adjustments as fine as the order of magnitude of the wire size used for the resistance.

In the description of the embodiment illustrated in Fig. 4 like parts have been given the same reference numerals as used in Figs. 1 through 3. The potentiometer illustrated in Fig. 4 has a subframe 11 to which a carrier plate 18 bearing an elongate resistance element 19 is fixed. A cover 48 encloses the potentiometer.

A slider 60 retained in the framework by a retaining strip 61 and movable by means of a lever 62 extending exteriorly of the device has a pair of spaced posts 64, 65 extending vertically from the upper surface of the slider. The slider carries the contact arms for both the resistor and a shorting bar but only the former is described. A screw 66 is mounted horizontally between the posts so that it rotates freely in the posts. A head 67 and a nut 68 retain the screw between the posts.

An internally threaded yoke 70 engages the screw and supports a conductive strip 71 having a free end 72 in contact with electrical resistor 19. Bottom face 73 of the yoke is flush with the upper surface of the slider so that the yoke cannot rotate.

Before cover 48 is put in place, screw 66 is accessible by means of the opening between the carrier plate and the bottom 13 of the framework. When the screw is turned, the yoke and the attached conductive strip advance parallel to the extent of the electrical resistor.

The potentiometer of Figs. 5 and 6 has a cylindrical outer configuration and the device is enclosed in a hollow cylindrical tube 80 which serves as a closure member or cover. A framework 82 has opposing sides 83, 84 extending between end pieces 85. Before cover 80 is installed, the framework is open between the sides at both top and bottom. An electrical resistor 86 and a shorting bar 87 are mounted on the inner surface of each framework side. An actuating shaft 89 supports a slider 90 which is fixed to the shaft and slides along a guide bar 91.

The embodiment of Figs. 5 and 6 has a pair of electrical resistors and the travel of the slider with respect to each resistor must be phased separately. Therefore, a pair of adjustable contact arms 92 are provided. Each contact arm comprises an L-shaped bracket 93 having an upper portion 94 and a downwardly extending portion 95. Projecting from the downwardly extending portion are two spaced conductive strips 96, 97. One strip makes contact with the electrical resistor and the other strip contacts the shorting bar.

Upper portion 94 of the bracket contains an elongated hole 98 that is elongated in the direction of slider travel. Means such as a screw 99 tapped into the slider extends through the elongated hole, and, when tightened, fixes the bracket to the slider.

By loosening screw 98 of either contact arm, the respective arm may be adjusted with respect to the electrical resistor with which it is in contact. When each of the contact arms has been adjusted so that the position of the slider is in phase with the voltage readings of the resistor circuit, the screws may be tightened and cover 80 put in place.

In all of the described embodiments the contact arm for the shorting bar is an integral part of the contact arm electrically connected to the resistor. However, the shorting bar contact arm may take any form so long as there is electrical connection between the resistor contact arm and shorting bar contact arm.

The inventive concept embodied in the particular devices described is capable of wide application in its field. The invention may be embodied in linear motion potentiometers of many types and provides an efficient method for accurate phase-adjusting of such devices.

I claim:

1. A linear motion potentiometer comprising a framework; an elongate resistance element rigidly supported in the framework; a slider slidably mounted in the framework; a contact arm including supporting means extending from the slider, a screw rotatable in the supporting means, an internally threaded yoke engaging the screw, and a conductive strip fastened to the yoke and in slidable contact with the electrical resistance element, said yoke adapted to move in a path parallel to the travel of the slider when the screw is turned; the framework having an opening therein to enable access to the screw; a closure member mounted to the framework enclosing the resistance element and the contact arm; electrical conductors connected to the resistance element and the contact arm and extending exteriorly of the framework and the closure member; and means exterior of the framework and the closure member for moving the slider within the framework.

2. A linear motion potentiometer comprising a framework; an elongate resistance element rigidly supported in the framework; a slider slidably mounted in the framework; a contact arm including a pair of spaced posts extending from the slider, a screw extending between and rotatable in the posts, an internally threaded yoke engaging the screw, and a conductive strip fastened to the yoke and in slidable contact with the resistance element, said yoke adapted to move in a path parallel to the travel of the slider when the screw is turned; the framework having an opening therein to enable access to the screw; a closure member mounted to the framework enclosing the resistance element and the contact arm; electrical conductors connected to the resistance element and the contact arm and extending exteriorly of the framework and the closure member; and means exterior of the framework and the closure member for moving the slider within the framework.

3. A linear motion potentiometer comprising in combination a framework; a carrier plate fixed to the framework; an elongate resistance element rigidly supported in the carrier plate; a slider slidably mounted in the framework; a contact arm including a pair of spaced posts extending from the slider, a screw extending between and rotatable in the posts, an internally threaded yoke engaging the screw, and a conductive strip fastened to the yoke and in slidable contact with the electrical resistance element, said yoke adapted to move in a path parallel to the travel of the slider when the screw is turned; the framework having an opening therein to enable acess to the screw; means for adjusting the carrier plate relative to the framework along the direction of slider movement while the conductive strip is in contact with the resistance element; a closure member mounted to the framwork enclosing the carrier plate and the contact arm; electrical conductors connected to the resistance element and the contact arm and extending exteriorly of the framework and the closure member; and means exterior of the framework and the closure member for moving the slider within the framework.

4. In a linear motion potentiometer including an elongate resistance element and a slider, a contact arm comprising a pair of spaced posts extending from the slider, a screw extending between and rotatable in the posts, an internally threaded yoke engaging the screw, and a conductive strip fastened to the yoke and in slidable contact with the resistance element, said yoke adapted to move in a path parallel to the travel of the slider while the conductive strip remains in contact with the resistance element when the screw is turned.

References Cited in the file of this patent

UNITED STATES PATENTS

| 2,668,218 | Searle | Feb. 2, 1954 |
| 2,706,230 | Bourns et al. | Apr. 12, 1955 |
| 2,751,475 | Gottshall | June 19, 1955 |
| 2,759,080 | Bourns | Aug. 14, 1956 |
| 2,813,183 | Gearheart | Nov. 12, 1957 |

FOREIGN PATENTS

| 488,245 | France | June 10, 1918 |
| 932,839 | France | Dec. 1, 1947 |